(No Model.)
E. R. HARDING.
TROLLEY FOR ELECTRIC RAILWAYS.
No. 467,250. Patented Jan. 19, 1892.
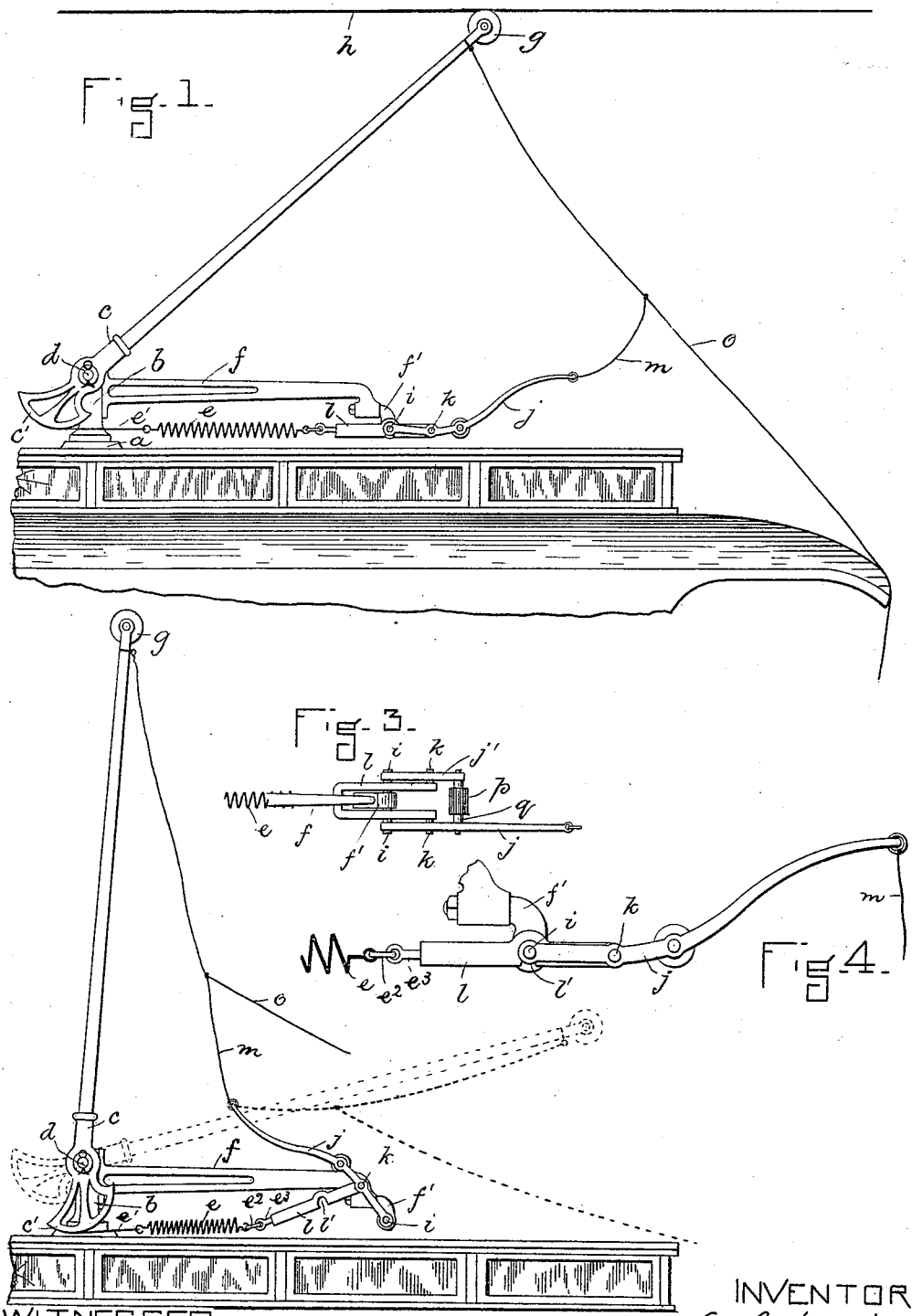
WITNESSES
James J. Ball
Ewing W. Hamlen
INVENTOR
E. R. Harding
by Wright Brown Quimby
Attys

UNITED STATES PATENT OFFICE.

EDWIN R. HARDING, OF WINTHROP, MASSACHUSETTS.

TROLLEY FOR ELECTRIC RAILWAYS.

SPECIFICATION forming part of Letters Patent No. 467,250, dated January 19, 1892.

Application filed January 3, 1891. Serial No. 376,631. (No model.)

*To all whom it may concern:*

Be it known that I, EDWIN R. HARDING, of Winthrop, in the county of Suffolk and State of Massachusetts, have invented certain new and useful Improvements in Trolleys for Electric Railways, of which the following is a specification.

This invention has for its object to provide a trolley the spring of which shall be automatically slackened or relieved of tension in the event of the trolley jumping the conductor against which it is pressed by said spring, so that the trolley will immediately fall below its normal position after it has jumped the conductor, and will therefore be prevented from breaking or injuring either itself or the conductor-supporting wires or insulators by flying forcibly upward above the conductor, as it is liable to do in the form of trolley now in general use.

My invention consists in the combination, with a pivoted trolley and an impelling-spring therefor, of an arm affixed to the trolley-base, a lever pivoted to said arm, a yoke or spring-support pivoted to said lever and engaged with the outer end of the trolley-spring, said lever and spring-support being arranged so that when the lever is in its normal position it holds the spring-support in position to maintain the spring in a state of operative tension, and a connection between said lever and the trolley-arm, whereby when the trolley-arm rises above its normal position said lever and spring-support are displaced, the arrangement being such that when the trolley is in its normal position in engagement with the conductor the said support remains in position to give the spring the required operative tension; but when the trolley jumps the conductor and moves upwardly above its normal position said movement will cause the connection between the trolley and the movable spring-support to displace said support, and thus permit the contraction and loss of tension of the spring, so that the trolley will immediately fall below its normal position, and will therefore be prevented from striking any of the parts of the line structure.

Of the accompanying drawings, forming a part of this specification, Figure 1 represents a side elevation of the roof of a street-car and of a pivoted trolley thereon provided with my improvement, the trolley being shown in its normal position and engaged with the overhead conductor. Fig. 2 represents a side elevation showing by full lines the trolley raised above its normal position after jumping the conductor and by dotted lines the position the trolley occupies when it falls below its normal position in consequence of the displacement of the movable support for the spring. Fig. 3 represents a top view, and Fig. 4 a side view, of the movable support for the spring.

The same letters of reference indicate the same parts in all the figures.

In the drawings, *a* represents the standard, which is attached, as usual, to the roof of the car and serves as the axis or pivot on which the socketed base *b* of the trolley may rotate horizontally.

*c* represents the trolley-arm, which is pivoted at *d* to the base *b* and has the cam-shaped end *c'*, to which is attached the strap *e'*, engaged with the inner end of the trolley-operating spring *e*.

*f* represents the arm, which projects horizontally from the base *b* and carries at its outer end the movable spring-support embodying my invention.

The parts thus far described comprise the well-known pivoted trolley apparatus now in general use, the base *b* being adapted to turn on the standard *a* to enable the trolley-arm to incline toward either end of the car, while the spring *e* under normal conditions acts to press the trolley-arm upwardly, so that its wheel *g* is pressed against the under side of the overhead conductor *h* in the usual way.

In carrying out my invention I provide a movable support for the outer end of the spring *e*, said support being carried by the outer end of the arm *f*, and a connection between said support and the trolley-arm, whereby when the trolley-arm rises above its normal position the said movable support will be displaced and caused to permit the contraction of the spring and the falling of the trolley-arm to a point below its normal position.

I have shown in the drawings the best method at present known to me of carrying my invention into practice; but I do not wish to be understood as limiting myself to the details of mechanism hereinafter described embodying my invention.

In carrying out my invention I pivot at $i$ to an ear $f'$ on the arm $f$ a lever $j$ of considerable length. To said lever is pivoted at $k$ a yoke $l$, to the swinging end of which the outer end of the spring $e$ is connected in any suitable way, as by a ring $e^2$, engaged with an eyebolt $e^3$, affixed to the swinging end of the said yoke. The outer or swinging end of the lever $j$ is connected by a short cord $m$ with a cord $o$, which extends from the upper portion of the trolley-arm downwardly over the end of the car to enable the conductor to pull down the trolley-arm. The lever $j$ and yoke $l$ are so arranged that when they are in the position shown in Figs. 1, 3, and 4 the pivot $i$, connecting the lever with the ear $f'$, will be between the spring and the pivots $k$, connecting the yoke $l$ with the lever $j$, said pivots $i$ and $k$ being nearly in line with the spring, so that the stress of the spring tends to hold the lever $j$ and yoke $l$ in said position. The pivot $i$ should in practice be slightly above a line extending from the center of the spring to the pivot $k$ when the parts are in the position last described, so that there will be no liability of the accidental raising of the lever $j$ by the stress of the spring.

The yoke $l$ is provided in its sides with recesses $l'$ to fit over the pivot $i$ and permit the described relative position of the spring and pivots. When the outer end of the lever is given a slight upward movement, the pivots $k$ are raised above the pivot $i$, so that the stress of the spring tends to pull the lever $j$ and yoke $l$ over to the position shown in Fig. 2, the spring being thus permitted to contract and lose its power of pressing the trolley-arm upwardly. Hence the trolley-arm is deprived of its support and falls to the position shown in dotted lines in Fig. 2. It will be seen, therefore, that when the trolley jumps the conductor $h$ and swings upwardly the cord $o$ acts through the connecting-cord $m$ on the outer end of the lever $j$ and raises said lever, with the result above described. After the displacement of the yoke $l$, which, for convenience, I call the "spring-support," the parts may be restored to the position shown in Figs. 1, 3, and 4 by a downward pull on the cord $o$, said cord acting through the connecting-cord $m$ on the lever $j$ and drawing the outer end thereof over or backwardly until the pivots $i$ and $k$ are again brought into such relation with the spring as to cause the yoke or spring-support $l$ to hold the spring in its extended condition and restore the necessary operative tension thereto. The spring is thus caused to again press the trolley-arm upwardly, so that wheel or trolley $g$ may be again engaged with the conductor $h$ by proper manipulation of the cord $o$.

It will be seen that after the spring has been automatically deprived of its tension or supporting power, as above described, it may be reset simply by the manipulation of the trolley-cord $o$. It will also be seen that the mechanism embodying my improvement is extremely simple and may be applied to ordinary trolleys now in general use without any change in the construction of the trolley stand or base.

To prevent injury of the trolley-arm when it falls from its normal after jumping the conductor, I provide a yielding buffer $p$, which is preferably a cylindrical piece of vulcanized rubber placed upon a stud or cross-bar $q$, attached at one end to the lever $j$. The other end of said cross-bar is supported by an arm $j'$, which swings upon the pivot $i$ and constitutes an adjunct of the lever $j$ in supporting the cross-bar $q$ and yoke or spring-support $l$, as shown in Fig. 3. Said buffer $p$ strikes the upper edge of the arm $f$ when the lever $j$ is displaced in consequence of the jumping of the trolley-arm and is in position to receive the blow of the falling trolley-arm, said blow being thus cushioned and prevented from doing any injury.

I claim—

1. The combination, with a pivoted trolley and an impelling-spring therefor, of an arm affixed to the trolley-base, a lever pivoted to said arm, a yoke or spring-support pivoted to said lever and engaged with the outer end of the trolley-spring, said lever and spring-support being arranged so that when the lever is in its normal position it holds the spring-support in position to maintain the spring in a state of operative tension, and a connection between said lever and the trolley-arm, whereby when the trolley-arm rises above its normal position said lever and spring-support are displaced, as set forth.

2. The combination, with a pivoted trolley and an impelling-spring therefor, of an arm affixed to the trolley-base, a lever pivoted to said arm, a yoke or spring-support pivoted to said lever and engaged with the outer end of the trolley-spring, said lever and spring-support being arranged so that when the lever is in its normal position it holds the spring-support in position to maintain the spring in a state of operative tension, the cord extending downwardly from the trolley-arm, and a connection between said cord and lever, whereby the lever may be reset by a downward pull on the cord, as set forth.

In testimony whereof I have signed my name to this specification, in the presence of two subscribing witnesses, this 1st day of January, A. D. 1891.

EDWIN R. HARDING.

Witnesses:
C. F. BROWN,
EWING W. HAMLEN.